US012613970B2

(12) United States Patent  
Singh et al.

(10) Patent No.: US 12,613,970 B2  
(45) Date of Patent: Apr. 28, 2026

(54) SEAMLESS AND SECURED DEVICE STARTUP AFTER DEVICE PART REPLACEMENT

(71) Applicant: Dell Products L.P., Round Rock, TX (US)

(72) Inventors: Ankit Singh, Bangalore (IN); Shrikant U. Hallur, Bangalore (IN); Naveen Awasthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 18/618,353

(22) Filed: Mar. 27, 2024

(65) Prior Publication Data

US 2025/0307412 A1     Oct. 2, 2025

(51) Int. Cl.  
*G06F 21/57*          (2013.01)

(52) U.S. Cl.  
CPC .................................. *G06F 21/575* (2013.01)

(58) Field of Classification Search  
CPC .................................................... G06F 21/575  
See application file for complete search history.

(56) References Cited

U.S. PATENT DOCUMENTS

| | | | |
|---|---|---|---|
| 6,163,849 A | 12/2000 | Nouri | |
| 6,668,376 B1 | 12/2003 | Wang | |
| 6,854,054 B1 | 2/2005 | Kavanagh | |
| 7,130,997 B2 | 10/2006 | Hsu | |
| 8,136,900 B2 * | 3/2012 | Iwasaki ...................... | B41J 2/09 |
| | | | 713/168 |
| 8,346,985 B2 | 1/2013 | Chassot | |
| 9,152,402 B2 | 10/2015 | Scheidel et al. | |
| 9,875,115 B2 | 1/2018 | Russinovich | |
| 9,990,325 B2 | 6/2018 | Hetzler | |
| 10,901,627 B1 | 1/2021 | Bshara | |
| 11,212,123 B2 | 12/2021 | Yoon | |
| 11,282,161 B2 | 3/2022 | Ray et al. | |
| 11,489,827 B2 | 11/2022 | Knotwell et al. | |
| 11,556,359 B2 | 1/2023 | Hart et al. | |
| 11,768,781 B2 | 9/2023 | Cooray et al. | |

(Continued)

OTHER PUBLICATIONS

Seongwook, Jin et al., "Architectual Support for Secure Virtualization under a Vulnerable Hypervisor", 2011 44th Annual IEEE/ACM International Symposium on Microarchitecture (MICRO), Porto Alegre, Brazil, 2011, pp. 272-283 (12 pages).

*Primary Examiner* — Zahid Choudhury  
(74) *Attorney, Agent, or Firm* — WOMBLE BOND DICKINSON (US) LLP

(57)          ABSTRACT

Methods and systems for managing device startup are disclosed. Device keys used by boot up components of a data processing system to access one or more hardware and/or software components of the data processing system may be maintained by an entity installed within the data processing system that operates independently of a main processor of the data processing system. New and/or replacement device keys may be obtained by said entity while the data processing system is in a powered off state such that when the data processing system is later powered on, the boot up components will have access to the new and/or replacement device keys to effectuate a seamless boot up of the data processing system using newly installed ones of the one or more hardware and/or software components.

17 Claims, 11 Drawing Sheets

(56) References Cited

U.S. PATENT DOCUMENTS

| | | |
|---|---|---|
| 11,770,246 B2 | 9/2023 | Ong |
| 11,775,651 B2 | 10/2023 | Jacobs |
| 12,299,184 B2 | 5/2025 | Wheeler |
| 12,353,609 B2 * | 7/2025 | Nelogal ................ G06F 21/575 |
| 2004/0210897 A1 | 10/2004 | Brockway |
| 2007/0198996 A1 | 8/2007 | Chiu |
| 2009/0054045 A1 | 2/2009 | Zakrzewski |
| 2011/0055541 A1 | 3/2011 | Lee |
| 2012/0023319 A1 | 1/2012 | Chin |
| 2012/0060023 A1 | 3/2012 | Park |
| 2013/0276144 A1 | 10/2013 | Hansen |
| 2016/0364297 A1 | 12/2016 | Lo |
| 2018/0032349 A1 | 2/2018 | Bhimanadhuni |
| 2019/0068772 A1 | 2/2019 | Lo |
| 2020/0074083 A1 | 3/2020 | Hou |
| 2020/0242051 A1 * | 7/2020 | Bisa ................... G06F 11/1076 |
| 2020/0244445 A1 * | 7/2020 | Ponnusamy .......... G06F 21/575 |
| 2020/0250293 A1 * | 8/2020 | Paulraj .................... G06F 9/441 |
| 2020/0356669 A1 | 11/2020 | Kim |
| 2021/0034132 A1 | 2/2021 | Hamlin |
| 2021/0099519 A1 | 4/2021 | Christian |
| 2022/0222349 A1 | 7/2022 | Lambert |
| 2023/0132176 A1 * | 4/2023 | Nelogal ................ G06F 9/4401 |
| | | 713/193 |
| 2023/0136229 A1 | 5/2023 | Lee |
| 2023/0229454 A1 | 7/2023 | Lagnado |
| 2023/0259291 A1 | 8/2023 | Porzio |
| 2023/0259472 A1 | 8/2023 | Azam |
| 2023/0297261 A1 | 9/2023 | Kim |
| 2024/0362370 A1 | 10/2024 | Jain |

* cited by examiner

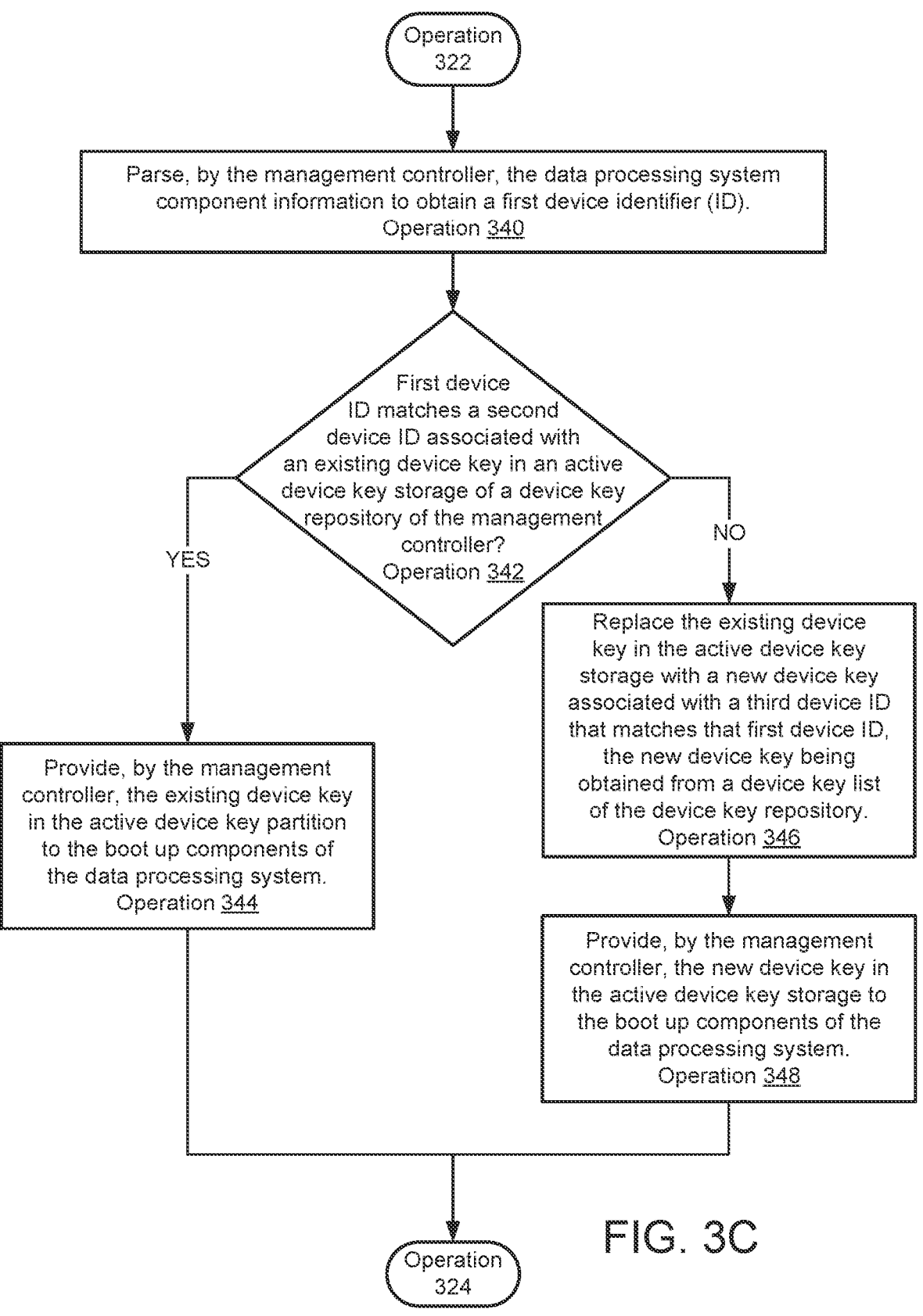

Operation 322

Parse, by the management controller, the data processing system component information to obtain a first device identifier (ID).
Operation 340

First device ID matches a second device ID associated with an existing device key in an active device key storage of a device key repository of the management controller?
Operation 342

YES

NO

Provide, by the management controller, the existing device key in the active device key partition to the boot up components of the data processing system.
Operation 344

Replace the existing device key in the active device key storage with a new device key associated with a third device ID that matches that first device ID, the new device key being obtained from a device key list of the device key repository.
Operation 346

Provide, by the management controller, the new device key in the active device key storage to the boot up components of the data processing system.
Operation 348

Operation 324

FIG. 3C

SEAMLESS AND SECURED DEVICE STARTUP AFTER DEVICE PART REPLACEMENT

FIELD

Embodiments disclosed herein relate generally to device startup. More particularly, embodiments disclosed herein relate to systems and methods to manage a device's startup (also referred to herein as "a boot up process") in a secured manner upon replacement of one or more of the device's components.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIGS. 3A-3C show flowcharts in accordance with one or more embodiments.

DETAILED DESCRIPTION

Figure 1A:
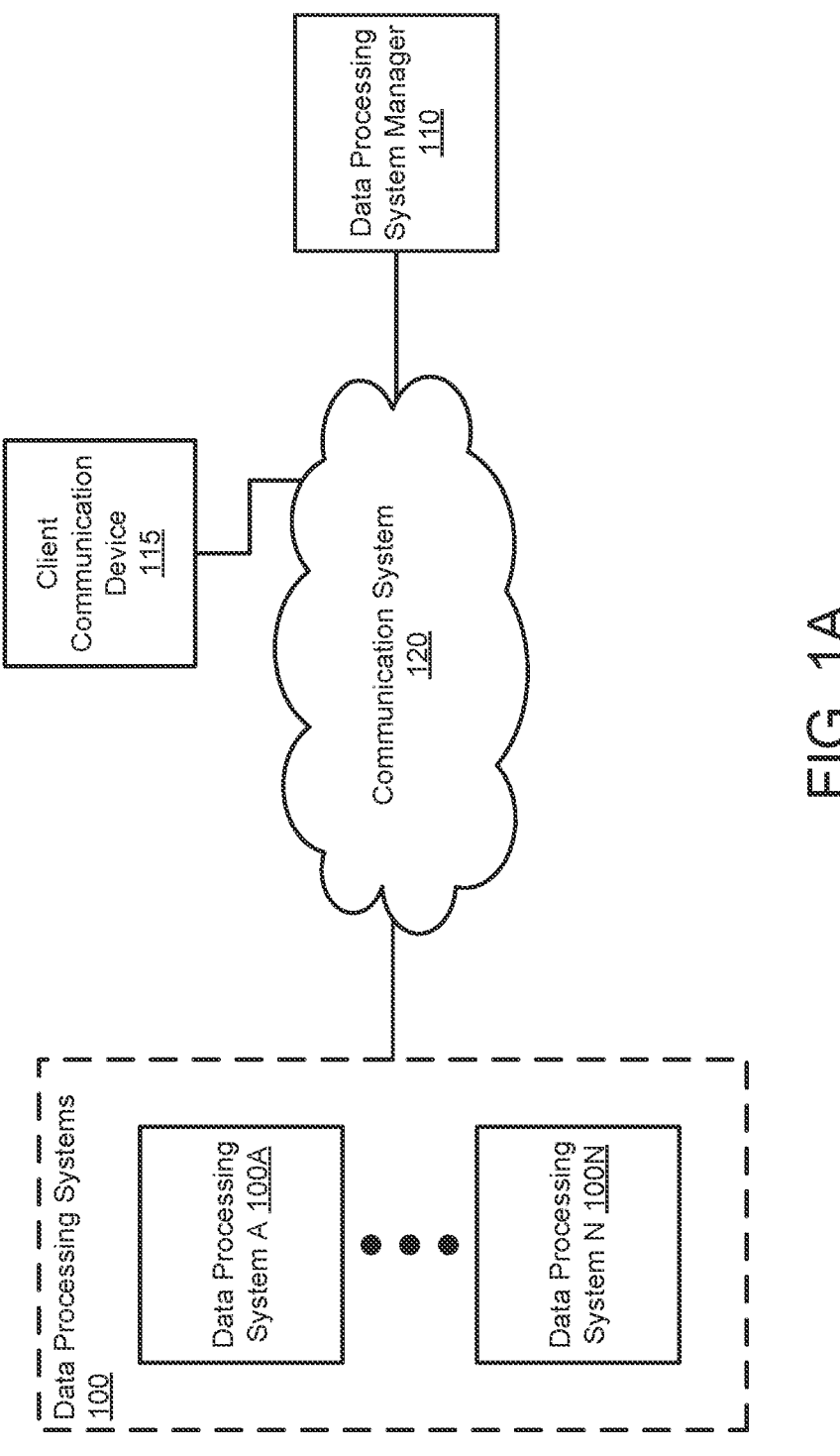
FIG. 1A shows a block diagram illustrating a system in accordance with one or more embodiments.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a boot up process (e.g., a startup) of a data processing system after one or more components of the data processing system has been replaced. In particular, to increase security and to prevent attacks by malicious third-party actors (e.g., hackers, phishing schemes, etc.), more and more components of data processing systems (such as computing devices, as described below in reference to FIG. 4) are configured with secured areas (e.g., secured portions) that require authentication before the components can be utilized (e.g., used) by a data processing system in which the components are installed.

For example, to prevent replay attacks, memory devices such as Non-Volatile Memory Express (NVMe) based solid-state drives (SSDs) may be configured with a secured portion such as a replay protected memory block (RPMB) that prevents read and/or write access to the SSD without proper authentication. Such authentication by the RPMB may usually involve an authentication key that is known by both the RPMB and the host (e.g., the data processing system in which the SSD is installed). For additional security, the authentication key used by the RPMB is written only once in the lifetime of the SSD in a trusted environment (e.g., the factory in which the SSD is manufactured), and is provided to the host to be stored in a trusted platform module (TPM) installed on a processing unit (e.g., the motherboard) of the host.

However, even the TPM may not be secure from outside attacks. Furthermore, once a component (e.g., the SSD) is replaced due to malfunction, communication between the host and a newly replaced component (e.g., a newly replaced SSD) cannot happen due to the host no longer having the new authentication key (e.g., or other form of authentication) of the newly replaced component. As a result, the host may not be able to properly boot up (e.g., complete a startup) from loss of access to these components (e.g., losing access to a boot partition and/or a startup partition stored behind the RPMB of the newly replaced SSD). Updating the host with the new authentication key (to once again be able to complete a startup of the host) requires a complete re-spin of the host's build, which involves unnecessary and onerous validation, bandwidth, and costs. Thus, a more secured and seamless storage and access schema to the authentication key of the SSD (and other authentication keys required for the host to communication with other components (e.g., software or hardware) installed within the host) is required.

To resolve the above security and burdensome component replacement issues, one or more embodiments provide an independent device (e.g., management controller 152 described below in reference to FIGS. 1B and 1C) that will not be compromised if the host processing unit (e.g., the motherboard), and any other in-band components connected to the host processing unit, are compromised. Rather than using a TPM (or other equivalent) that would be compromised when the host processing unit (and another other in-band components connected to the host processing unit) is compromised, this independent device may be configured with a device key repository to store one or more authentication keys (or other forms of authentication such as encrypted tokens or the like) for accessing components installed within the data processing system that require
authentication before being able to be accessed (or used) by
the data processing system.

The independent device (e.g., management controller 152
discussed below) may also (as discussed in more detail
below) be configured to receive, independently from other
operations of the host device, the authentication key(s)
directly from a manufacturer (or distributor, administrator,
etc.) of a component. Additionally, the independent device
may be configured to provide the host with the stored
authentication key(s) during a start up (e.g., a boot up
process) upon request by the host. As a result, embodiments
herein also provide an improved system that does not require
a complete re-spin of the host's build each time a new part
is installed (e.g., added, replaced, etc.) into the host, thus
effectively eliminating the unnecessary validation, band-
width, and costs associated with such re-spins.

Thus, embodiments disclosed herein may provide, among
others an improvement to the above-discussed security and
burdensome component replacement issues (e.g., an existing
technical problem in the present technical field of embodi-
ments disclosed herein).

In an embodiment, a method for managing a boot up
process of a data processing system is provided. The method
may include: obtaining, by a management controller the data
processing system, a device key request from one or more
boot up components of the data processing system, the
device key request comprising data processing system com-
ponent information; using, by the management controller,
the data processing system component information to pro-
vide the one or more boot up components with a device key
stored in a device key repository of the management con-
troller; and using, by the boot up components, the device key
to complete a boot up of the data processing system.

The one or more boot up components are distinct and
separate from the management controller, the boot up com-
ponents comprising a first processor, and the management
controller comprising a second processor that is different
and operates independently from the first processor.

The first processor being a main processor on which an
operating system (OS) of the data processing system runs.

Using the data processing system component information
to provide the one or more boot up components with the
device key may include: parsing, by the management con-
troller, the data processing component information to obtain
a first device identifier (ID); determining, by the manage-
ment controller, that the data first device ID is different from
a second device ID associated with an existing device key
stored in an active device key storage of the device key
repository; replacing the existing device key in the active
device key storage with a new device key having a third
device ID that matches the first device ID; and providing, by
the management controller, the new device key to the boot
up components as the device key requested in the device key
request.

An instance of the new device key and an instance of the
existing device key separate from the existing device key
stored in the active device key storage are stored in a device
key list stored in the device key repository of the manage-
ment controller. Replacing the existing device key in the
active device key storage may include: deleting the existing
device key from the active device key storage; instantiating
a copy of the new device key using the instance of the new
device key stored in the device key list; and after deleting the
existing device key from the active device storage, storing
the copy of the new device key into the active device key
storage.

The instance of the existing device key stored in the
device key list is maintained even after the existing device
key is deleted from the active device key storage.

The existing device key is associated with a first hardware
component of the data processing system that is no longer
installed within a body of the data processing system, and
the new device key is associated with a second hardware
component that is installed into the body of the data pro-
cessing system to replace the first hardware component.

The one or more boot up components do not maintain any
copies of the device key provided by the management
controller after completing the boot up of the data process-
ing system.

Using the device key to complete the boot up of the data
processing system may include: unlocking, by the boot up
components, a secured portion of a memory device of the
data processing system to access data processing system
data stored in the memory device; using, by the boot up
components, the data processing system data to boot up an
operating system (OS) of the data processing system.

The data processing system data comprises an image of
the OS, the memory device is non-volatile memory, and the
secured portion is a relay protected memory block (RPMB)
of the non-volatile memory.

Before the device key request is obtained by the manage-
ment controller, the method may further include: receiving,
by the management controller, a replacement device key
from a data processing system manager; and storing, by the
management controller, the replacement device key in a
device key list provisioned in the device key repository of
the management controller, the device key list including an
existing device key different from the replacement device
key.

The replacement device key is received by the manage-
ment controller when the data processing system is in a
powered off state.

A non-transitory media may include instructions that
when executed by a processor cause the computer-imple-
mented method to be performed.

A data processing system may include the non-transitory
media and a processor, and may perform the computer-
implemented method when the processor executes the
instructions in the non-transitory media.

Turning to FIG. 1A, a block diagram illustrating a system
100 in accordance with an embodiment is shown. The
system 100 shown in FIG. 1A may provide computer
implemented services. The computer implemented services
may include any type and quantity of computer implemented
services. For example, the computer implemented services
may include data storage services, instant messaging ser-
vices, database services, and/or any other type of service that
may be implemented with a computing device.

To provide the computer implemented services, the sys-
tem may include any number of data processing systems 100
(e.g., data processing systems 100A-100N). Data processing
systems 100 may provide the computer implemented ser-
vices to users of data processing systems 100 and/or to other
devices (not shown). Different data processing systems may
provide similar and/or different computer implemented ser-
vices.

To provide the computer implemented services, data
processing systems 100 may include various hardware com-
ponents (e.g., processors, memory modules, storage devices,
etc.) and host various software components (e.g., operating
systems, application, startup managers such as basic input-
output systems, etc.). These hardware and software components (discussed in more detail below in FIGS. 1B-1D) may provide the computer implemented services via their operation.

The software components may be implemented using various types of services. For example, each data processing system of the data processing systems 100 may host various services that provide the computer implemented service (e.g., application services) and/or that manage the operation of these services (e.g., management services). The aggregate (e.g., combination) of the management and application services may be a complete service that provide desired functionalities.

To manage the data processing systems 100, the system of FIG. 1A may include data processing system manager 110. Data processing system manager 110 may include various hardware components (e.g., processors, memory modules, storage devices, etc.) and host various software components (e.g., operating systems, application, startup managers such as basic input-output systems, etc.). These hardware and software components may provide the functionalities (e.g., the communication with and management of the data processing systems) of the data processing system manager 110.

In one example, the data processing system manager 110 may be a computing device (e.g., computing device of FIG. 4) such as a desktop computer or server that is used by used by manufacturers (or distributors, administrators, etc.) of one or more components installed within the data processing systems 100 to communicate with and manage (namely, the components installed within) the data processing systems 100.

The system of FIG. 1A may also include a client communication device 115. The client communication device 115 may be any type of computing device (e.g., computing device of FIG. 4) owned by a user of any of the data processing systems 100. More specifically, the client communication device 115 may be a computing device used by a user of a data processing system (e.g., data processing system A 100A) to communicate with the data processing system manager 110 when the data processing system A 100A is offline or broken (e.g., when a component and/or device within the data processing system A 100A is broken and needs replacement). For example, the client communication device 115 may be the user's work laptop or desktop computer, a tablet computer, a smartphone, or another (still working/functioning) data processing system (e.g., data processing system N 100N) among the data processing systems 100. As another example, the client communication device 115 may be the data processing system (e.g., data processing system A 100A) that needs a component/device replacement before the data processing system becomes unusable (e.g., can no longer communicate with other devices using communication system 120, can no longer power on, etc.).

Any of the components illustrated in FIG. 1A may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While FIG. 1A is illustrated as including a limited number of specific components, a system in accordance with an embodiment may include fewer, additional, and/or different components than those illustrated therein.

Figure 1B:
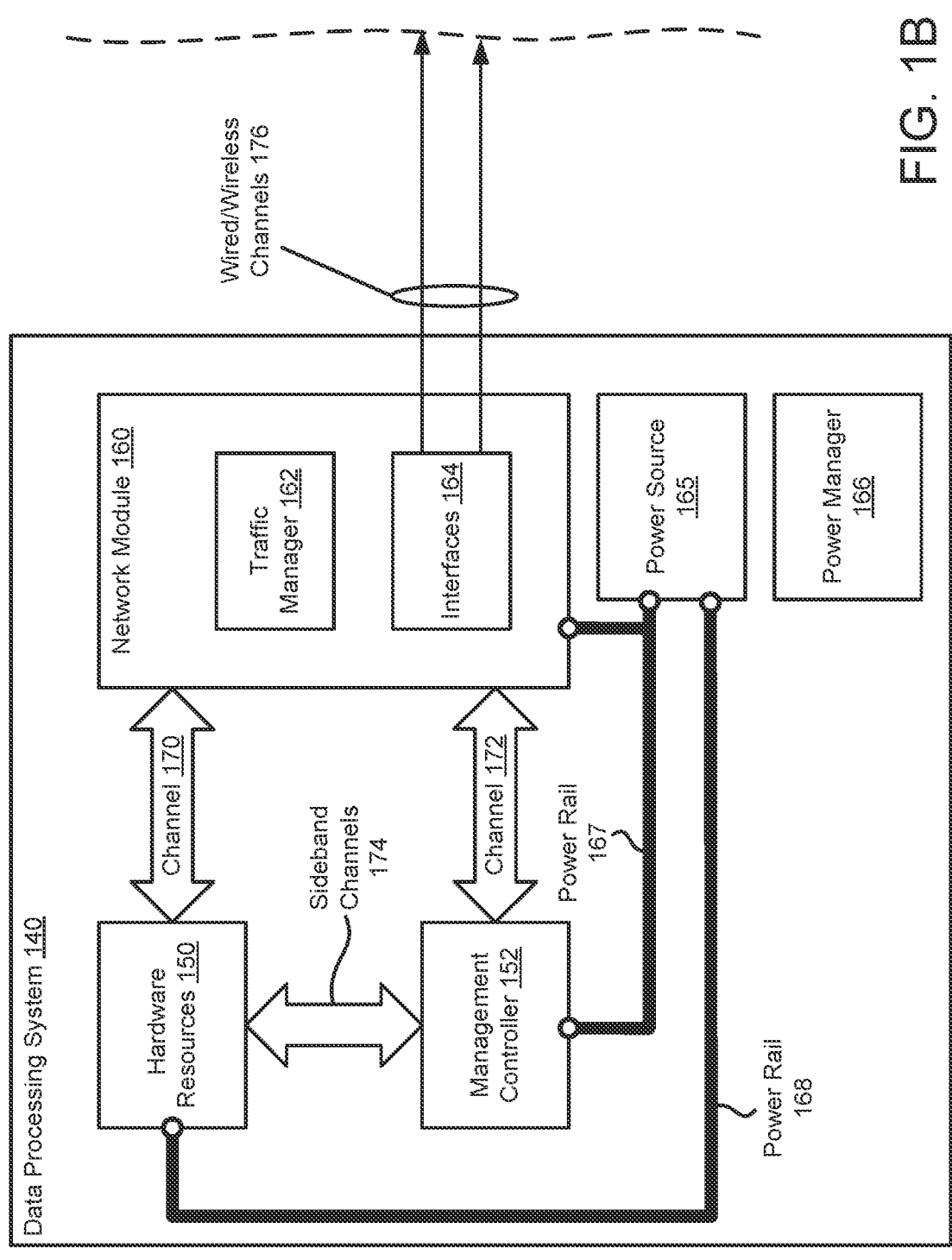
FIG. 1B shows a block diagram illustrating a data processing system in accordance with one or more embodiments.

Turning to FIG. 1B, a diagram illustrating data processing system 140 in accordance with an embodiment is shown. Data processing system 140 may be similar to any of the data processing systems 100 (e.g., any one of data processing systems 100A-100N) shown in FIG. 1A.

To provide computer implemented services, data processing system 140 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communication with other entities.

In embodiments, the processor (of the hardware resources 150) may be a main processor (e.g., the central processing unit (CPU) and motherboard on which the CPU is installed) of the data processing system 140. The processor (of the hardware resources 150), may also be the main processor on which an operating system (OS) of the data processing system 140 is stored and runs.

In embodiments, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a data processing system 140). Management controller 152 may provide various management functionalities for data processing system 140. For example, management controller 152 may monitor various ongoing processes performed by the in-band component, may manage power distribution, thermal management, and/or other functions of data processing system 140.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These component may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 165) that separately supplies power to power rails (e.g., 167, 168) that power the respective power domains. Power from the power source (e.g., a power supply, battery, etc.) may be selectively provided to the separate power rails to selectively power the different power domains. A power manager (e.g., 166) may manage power from power source 165 is supplied to the power rails. Management controller 152 may cooperate with power manager 166 to manage supply of power to these power domains.

In FIG. 1B, an example implementation of separate power domains using power rails 167-168 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 1C:
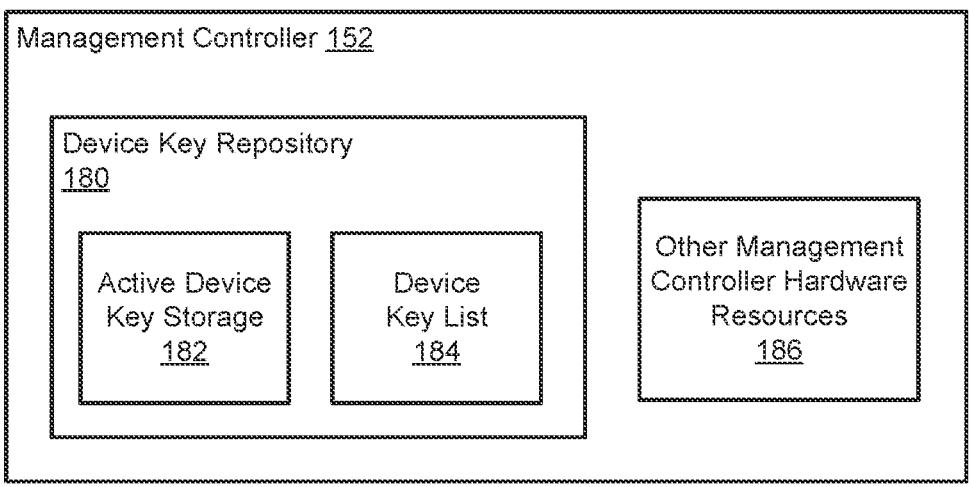
FIG. 1C shows a block diagram illustrating a management controller in accordance with one or more embodiments.

Turning to FIG. 1C, a diagram illustrating an example of a management controller 152 of data processing system 140 in accordance with an embodiment is shown. As shown in FIG. 1C, the management controller 152 may include a device key repository 180 and other management controller hardware resources 186. Each of these components will be described as follows.

The device key repository may be configured as a computer storage (e.g., a data structure, a memory device, etc.) for maintaining (e.g., storing) data (namely, for maintaining one or more authentication keys used by the data processing system 140 to access the functionalities and data of one or more of the hardware resources 150. Each authentication key (also referred to herein as a "device key") may be a unique identifier or code that is used to authenticate and gain access to one or more components/devices (e.g., one or more of the hardware resources 150, software components, etc.) installed within the data processing system 140. The unique identifier or code may be in any format, may be of any length, and may be composed of a combination of one or more of alphabetical characters, special characters, numbers, etc.

In embodiments, the device key repository 180 may include an active device key storage 182 and a device key list 184. More specifically, in an example where the data processing system 140 includes a hardware resource (of the hardware resources 150) that requires authentication such as an NVMe SSD configured with a RPMB, the active device key storage 182 may store an authentication key (or any other type of authentication data formats such as an encrypted token or the like), for that NVMe SSD.

In embodiments, when multiple hardware resources 150 require authentication, the device key repository 180 may be configured to include multiple ones of the active device key storage 182 (namely, one for each of the hardware resources that require authentication). Alternatively, the active device key storage 182 may be configured as a data structure (e.g., a list, table, etc.) that stores authentication keys and device identifications (IDs) (e.g., a serial number of each of the hardware resources 150) in a key-value pair format.

In embodiments, the active device key storage 182 may always be updated (e.g., by management controller 152) to always include authentication key(s) for hardware resources (of the hardware resources 150) that are currently installed within the data processing system 140. Said another way, the authentication key(s) in the active device key storage 182 portion of the device key repository 180 will always be a key associated with a hardware resource (of the hardware resources 150) that currently exists within a body (e.g., a computer chassis) of the data processing system 140. Additional details with regard to how the active device key storage 182 is updated is described in more detail below in FIGS. 2A-2C.

Device key list 184 of the device key repository 180 includes a data structure (e.g., a list, table, etc.) storing all device keys (e.g., authentication keys) that the management controller 152 has ever recorded (e.g., received from an administrator of the data processing system 140, received from a manufacturer or distributer of one or more hardware resources 150 of the data processing system 140, etc.). Said another way, the device key repository includes a list of all device keys associated with all original and replaced ones of the hardware resources 150 that were ever installed in and/or removed from the data processing system 140. The device key list 184 may store each device key with its associated device ID (e.g., the ID of the device and/or component, such as any of the hardware resources 150 of data processing system 140, that requires the device key for authentication purposes) in any format (e.g., as key-value pairs, or the like).

Having such a complete list advantageously allows an administrator (or technician) of the data processing system 140 to have a full understanding of all parts that have ever been installed within the data processing system 140. This further enhances the security and integrity of the data processing system 140 as the administrator (or technician) can use the complete list to determine whether unauthorized (e.g., boot-leg) components have ever been installed within the data processing system 140.

As further shown in FIG. 1C, management controller 152 includes other management controller hardware resources 186, which may include all hardware components (e.g., a processor, memory, etc.) required for the management controller to operate as a system on a chip or other type of independently operating computing device (e.g., independent from the in-band components, such as hardware resources 150, of a data processing system 140).

As a result, the other management controller hardware resources 186 may include one or more processors that are distinct and separate from a processor (e.g., the main processor of the hardware resources 150 discussed above in reference to FIG. 1B) of the data processing system 140. The one or more processors of the management controller hardware resources 186 may also operate independently from any processors of the hardware resources 150 of the data processing system 140.

Figure 1D:
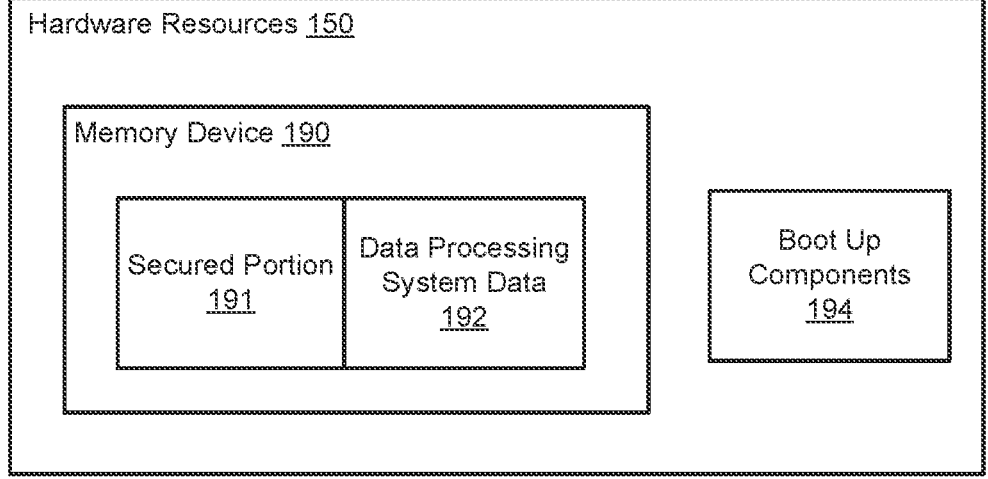
FIG. 1D shows a block diagram illustrating hardware resources of the data processing system in accordance with one or more embodiments.

Turning now to FIG. 1D, FIG. 1D shows an example of hardware resources 150 of data processing system 140. In this example, the hardware resources 150 in FIG. 1D includes a memory device 190 (such as an NVMe SSD) that includes a secured portion 191 (e.g., a RPMB) and a non-secured portion storing data processing system data 192. The secured portion 191 may be configured with any type of security protocol that would require the host (e.g., data processing system 140) to use a device key (e.g., an authentication key) to access the non-secured portion storing data processing system data 192. The non-secured portion storing data processing system data 192 may include, in part, a boot partition (or a startup partition) storing data required for completing a startup of the data process and user data (e.g., files, documents, applications, etc.) used by one or more users of the data processing system 140. In embodiments, the non-secured portion may be protected by the secured portion 191 (e.g., accessing the boot partition may require authentication through the RPMB of the NVMe SSD).

The example of the hardware resources 150 of FIG. 1D may also include boot up components 194. Boot up components 194 include all components (e.g., software and hardware such as one or more of hardware resources 150) of the data processing system 140 required to complete a boot up process (e.g., a startup) of the data processing system 140. In embodiments, a startup of the data processing system 140 may be completed when an operating system (OS) is completely booted up and the user is shown a log-in screen (or taken directly to a desktop screen) of the data processing system 140. In embodiments, the boot up components 194 do not include (e.g., are distinct and separate from) the management controller 152 of the data processing system 140.

Turning to FIGS. 2A-2D, data flow diagrams in accordance with one or more embodiments are provided. The data flow diagrams of FIGS. 2A-2D show a process for managing a boot up process of a data processing system (e.g., data processing system 140, FIG. 1B; any of data processing systems 100A-100N, FIG. 1A) after a device/component (e.g., one of hardware resources 150 of data processing system 140) has been replaced.

Although FIGS. 2A-2D will be described below specifically using a NVMe SSD as the device/component of the data processing system 140 being replaced, embodiments herein are not limited to the replacement of just the NVMe SSD and any other component (e.g., hardware or software) of the data processing system 140 may be replaced without departing from the scope of embodiments disclosed herein.

Figure 2A:
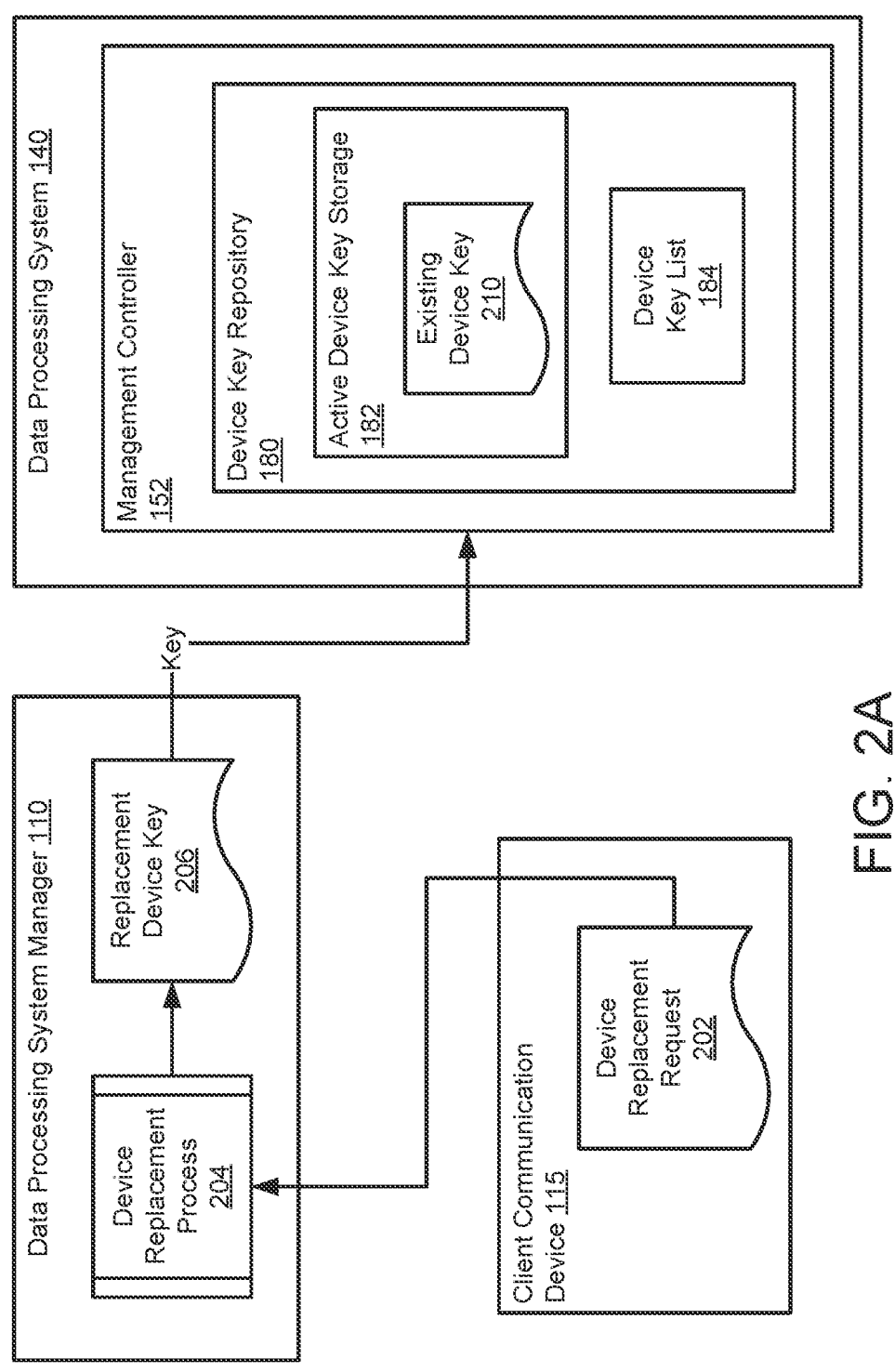
FIGS. 2A-2D show data flow diagrams in accordance with one or more embodiments.

Starting with FIG. 2A, a client communication device 115 (described above in FIG. 1A) generates a device replacement request 202 for replacing an NVMe SSD of a data processing system. The device replacement request 202 may be generated based on input information entered by a user of the client communication device 115 via a device replacement request graphical user interface GUI (e.g., a web page for requesting service and support) displayed on the client communication device 115. The device replacement request 202 may include information regarding which component/ device within the data processing system 140 (here, information regarding the NVMe SSD) needs to be replaced.

The device replacement request 202 may be transmitted (e.g., by the client communication device 115) to the data processing system manager 110 where the device replacement request 202 may be ingested by a device replacement process 204 of the data processing system manager 110.

In embodiments, as part of the device replacement process 204, the data processing system manager 110 parses the device replacement request 202 to determine that the NVMe SSD of the data processing system 140 requires replacing. The data processing system manager 110 then generates instructions for a user of the data processing system manager 110 (e.g., a supplier, manufacturer, and/or distributor of the NVMe SSD or the data processing system 140) to execute all necessary procedures (e.g., obtain a new NVMe SSD, copy all data from the broken NVMe SSD to the new NVMe SSD, etc.) to effectuate replacement of the NVMe SSD such that the data processing system 140 can once again be restored to a state before the existing NVMe SSD is no longer usable.

In embodiments, as part of the device replacement process 204, the data processing system manager 110 obtains (upon a new, replacement, NVMe SSD being selected) the authentication key associated with the new NVMe SSD as a replacement device key 206. The replacement device key 206 is then transmitted to the management controller 152 of the data processing system 140. In embodiments, at the time when the replacement device key 206 is being transmitted to the management controller 152, the data processing system 140 may be powered off (but still having access to a power source such as being connected to an outlet of an internal battery).

In the context of embodiments disclosed herein, the data processing system 140 being powered off means that the data processing system 140 has been shut down (but still has access to a power source such as being connected to an outlet of an internal battery) such that all of hardware resources 150 of data processing system 140 no longer receives power but the management controller 152 is still being powered through the data processing system's 140 existing access (e.g., connection) to the power source. See above discussion in FIG. 1B as to how the management controller 152 may still operate even though the data processing system 140 is powered off.

As shown in FIG. 2A, at the time when the data processing system 140 receives the replacement device key 206 for the new, replacement, NVMe SSD, the data processing system 140 still includes (in the active device key storage 182 of the device key repository 180 of management controller 152) an existing device key 210. This existing device key 210 is the authentication key associated with the (potentially broken and unusable) NVMe SSD that is being replaced with the new replacement NVMe SSD.

Upon receipt of the replacement device key 206, the management controller 152 stores the replacement device key 206 in the device key list 184, which (although not explicitly shown in FIG. 2A) also includes a copy (e.g., an instance) of the existing device key 210.

In embodiments, storing of the replacement device key 206 in the device key list 184 of the device key repository 180 of management controller 152 may complete the receipt of the new authentication key for the new, replacement, NVMe SSD. Said another way, a complete re-spin of the host's (e.g., the data processing system's 140) build is not required for the data processing system 140 to eventually use the new authentication key once the new, replacement, NVMe SSD arrives and is installed within the body (e.g., chassis) of the data processing system 140, which advantageously eliminates the unnecessary validation, bandwidth, and costs associated with such re-spins.

Figure 2B:
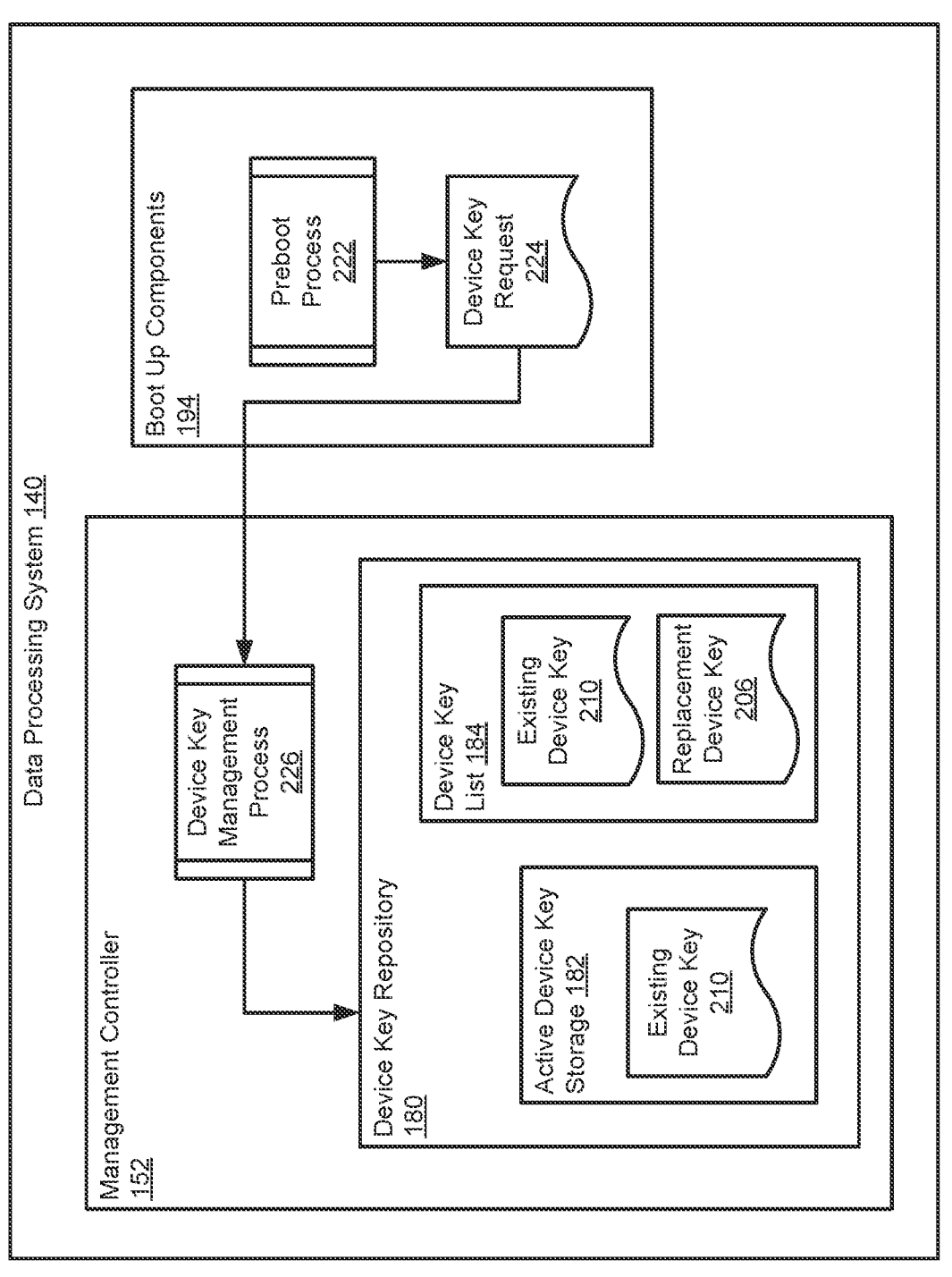

Turning now to FIG. 2B, assume that the new, replacement, NVMe SSD has arrived and has been installed within the data processing system 140 (e.g., to replace the previous potentially broken and unusable NVMe SSD) and a user of the data processing system has powered on the data processing system 140 (e.g., by pressing a power button of the data processing system 140 to allow power to reach the hardware resources 150 including the new, replacement, NVMe SSD). When the data processing system 140 is powered on, a preboot process 222 is initiated by the boot up components 194 of the data processing system 140.

As part of the preboot process, the boot up components generate a device key request 224 to request access to the new, replacement, NVMe SSD (namely, to access the boot partition and/or startup partition of the new, replacement, NVMe SSD in order for the data processing system 140 to boot up operating system (OS)).

In embodiments, the device key request 224 may include data processing system component information. The data processing system component information may include a list of all hardware and/or software components that the data processing system 140 has detected (e.g., obtained by a basic input/output system (BIOS), or other equivalent startup management entity of the data processing system 140, compiling an inventory of the components and/or devices installed within the data processing system at the time when the data processing system is powered on) upon power-up of the data processing system 140). The list included in the data processing system component information may include device IDs (or other equivalents) of all detected hardware and/or software components that are installed within the data processing system. At this stage, since the new, replacement, NVMe SSD has already been installed into the data processing system 140, the data processing system component information would include the device ID of the new, replacement, NVMe SSD (and would not include the device ID of the old NVMe SSD that was taken out).

As shown in FIG. 2B, the boot up components 194 transmit the device key request 224 to the management controller 152, which triggers the management controller 152 to perform device key management process 226.

In embodiments, as part of the device key management process 226, management controller 152 parses the device key request to obtain the device IDs included in the data processing system component information. The management controller 152 compares the obtained device IDs to device IDs stored in the active device key storage.

Assume, for this example of FIGS. 2A-2D, that the only component within the data processing system 140 that requires authentication is the NVMe SSD with the RPMB, in this example, the existing device key 210 would include a device ID associated with the old NVMe SSD that was taken out). Therefore, as part of the comparison, the management controller 152 will determine that the existing device key 210 in the active device key storage is no longer relevant and looks to the device key list 184 to determine whether any of the authentication keys stored in the device key list 184 is associated with the device ID of the new, placement, NVMe SSD that was included in the data processing system component information.

Figure 2C:
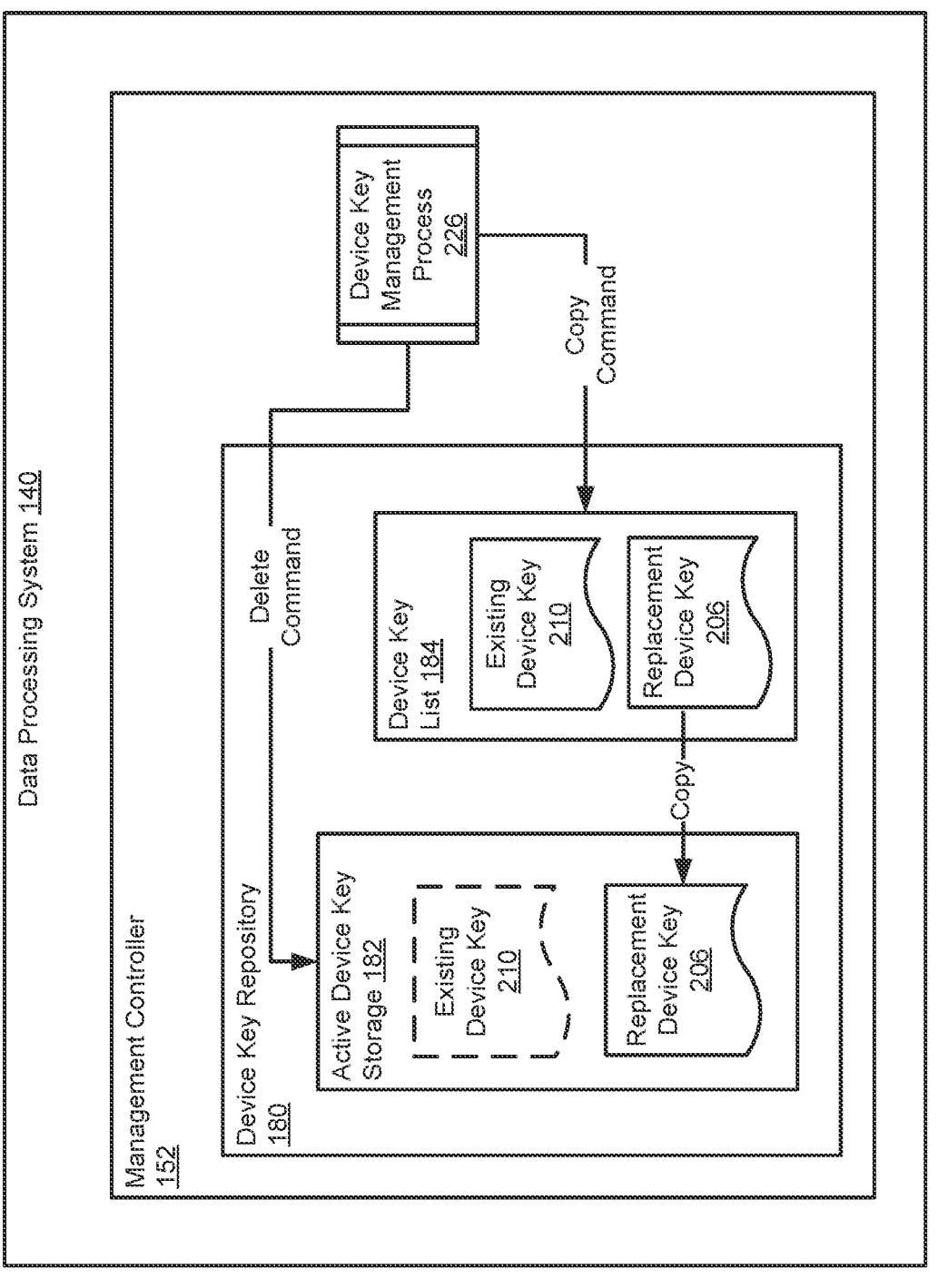

Turning to FIG. 2C, and continuing with the device key management process 226 discussed in FIG. 2B, the management controller 152 determines that: (i) the existing device key 210 is no longer relevant (e.g., because the NVMe SSD associated with the existing device key 210 has been removed from the data processing system 140); and (ii) that the device key list 184 includes the replacement device key 206 that includes a device ID that matches the device ID of the new, placement, NVMe SSD that was included in the data processing system component information.

As a result, the management controller 152 (as part of the device key management process 226) replaces the existing device key 210 with the replacement device key 206 by: (i) deleting (e.g., shown using the broken lines) the existing device key 210 from the active device key storage 182; and (ii) instantiating a copy (e.g., an instance) of the replacement device key 206 (from the device key list 184) into the active device key storage 182. In embodiments, when the existing device key 210 is deleted from the active device key storage 182, the copy (e.g., instance) of the existing device key 210 in the device key list 184 is not deleted from the device key list 184.

Thus, in embodiments, upon completion of the device key management process 226 in this example, the active device key storage 182 now stores a copy (e.g., instance) of the replacement device key 206 while copies of both of the existing device key 210 and replacement device key 206 are maintained in the device key list 184.

Figure 2D:
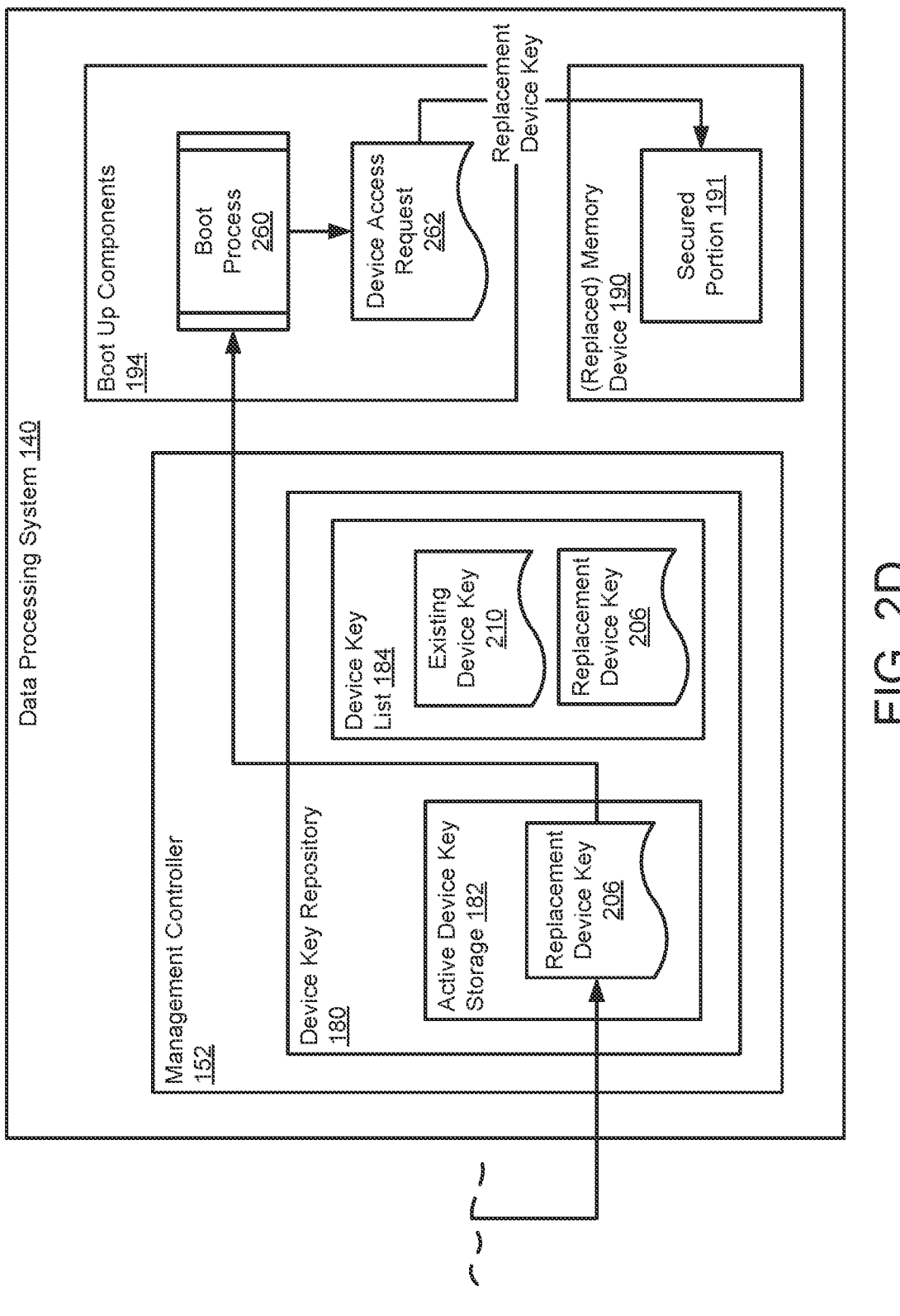

Turning to FIG. 2D, once the device key management process 226 is completed, the management controller 152 transmits a copy of the replacement device key 206 to the boot up components 194 where the replacement device key 206 is used as part of a boot process 260 of the boot up components 194. In embodiments, the boot process 260 follows after the preboot process 222 (of FIG. 2B) and is performed by the boot up components 194 to complete the boot up process (e.g., complete the startup) of the data processing system 140.

In embodiments, as part of the boot process 260 in this example shown in FIGS. 2A-2D, the boot up components 194 generate a device access request 262 that includes the replacement device key 206 received from the management controller 152. This device access request 262 is then transmitted to a secured portion 191 of the (replaced) memory device 190 (e.g., the RPMB of the new, replacement, NVMe SSD), where the replacement device key 206 is authenticated ty the secured portion 191 in order for the boot up components 194 to gain access to the non-secured portion storing data processing system data 192 (not shown). More specifically, for the boot up components 194 to gain authorization to access the boot partition and/or startup partition stored in the (replaced) memory device 190 in order for the data processing system 140 to complete a boot up of the data processing system's 140 operating system (OS) (e.g., to a state where a log-in screen or a desktop screen is presented to the user of the data processing system 140, or an equivalent state before either of these screens are shown where the OS is now running on the main processor of the data processing system 140).

Once the boot up process is completed, the previously broken one of the data processing system 140 may now be restored to a state before the previous NVMe SSD is no longer usable. Additionally, in embodiments, the boot up components 194 do not (as any part of the boot process 260) retain any information of the replacement device key 206 once the replacement device key 206 have successfully been used to gain authorization to access the (replaced) memory device 190.

Figure 3A:
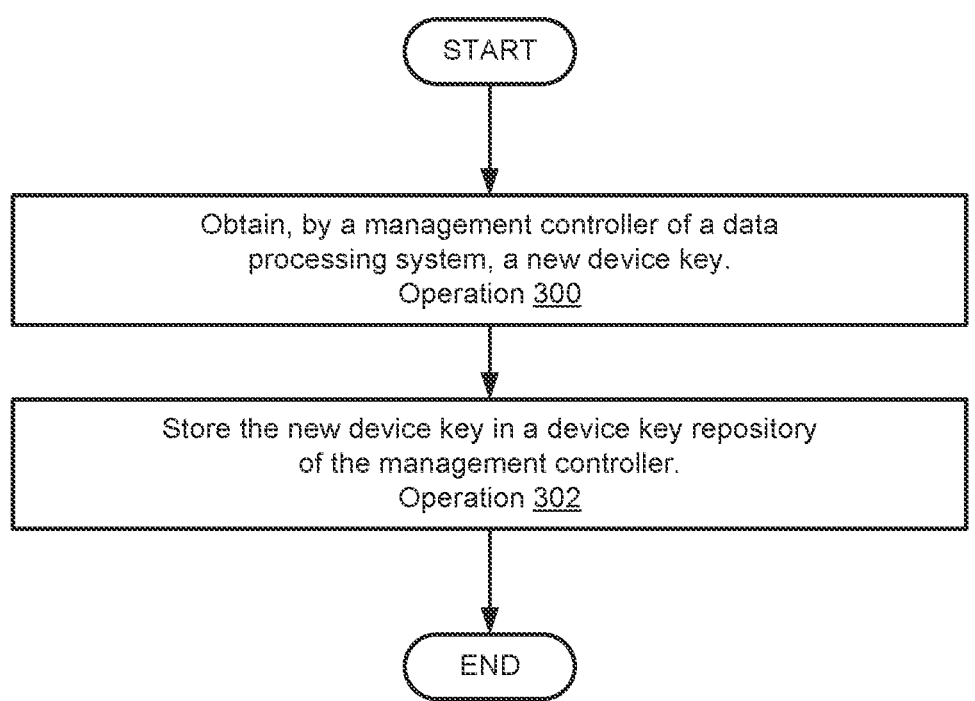
Figure 3B:
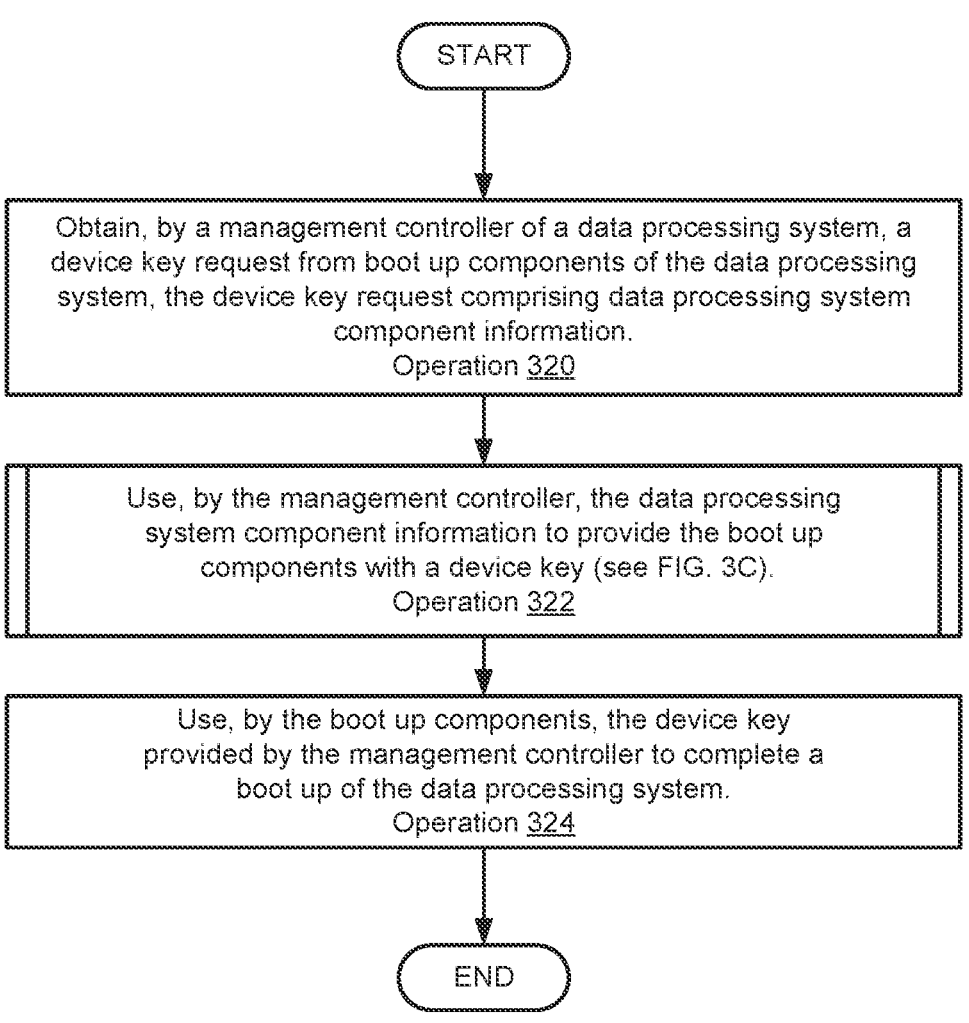

As discussed above, the components of FIGS. 1A-1D may perform various methods for managing a boot up process of a data processing system. FIGS. 3A-3C illustrate examples of methods that may be performed by the components of FIGS. 1A-1D. For example, any of the data processing systems 100 may perform all or a portion of the methods. In the diagrams discussed below and shown in FIGS. 3A-3C, any of the operations may be repeated, performed in different orders, and/or performed in parallel with or in a partially overlapping in time manner with other operations.

Starting with FIG. 3A, in operation 300 and as discussed above in reference to FIG. 2A, a management controller (e.g., management controller 152 of FIG. 1B) of a data processing system may obtain a new device key (e.g., the replacement device key 206 of FIGS. 2A-2D).

In embodiments, the new device key may be obtained from a data processing system manager (e.g., data processing system manager 110 of FIG. 1A). The new device key may be obtained in response to one or more devices and/or components (e.g., one or more of the hardware resources 150 of FIG. 1B) of the data processing system being replaced.

In operation 302, as discussed above in reference to FIG. 2A, the new device key is stored (e.g., by the management controller) in a device key repository (e.g., device key repository 180 of FIG. 1B) of the management controller. More specifically, the new device key may be stored in a device key list (e.g., device key list 184 of FIG. 1B) of the device key repository 180.

The method may end following operation 302.

Turning now to FIG. 3B, in operation 320, as discussed above in reference to FIGS. 2B-2C, a management controller of a data processing system obtains a device key request from one or more boot up components (e.g., from a main processor) of the data processing system.

In embodiments, the device key request may comprise data processing system component information including device IDs of all components (software and hardware) installed within the data processing system. Alternatively, the data processing system component information may include device IDs of only components (software and hardware) installed within the data processing system that require a device key (e.g., an authentication key) for the boot up components to access.

In operation 322, the management controller may use the data processing system component information to provide the boot up components with a device key. In particular, turning to operation 340 of FIG. 3C, the management controller may parse the data processing system component information to obtain a first device ID.

In operation 342, the management controller may make a determination as to whether the first device ID matches a second device ID associated with an existing device key that is stored in an active device key storage of a device key repository of the management controller.

In the event that the determination in operation 342 is "YES", the management controller (in operation 344) provides the existing device key in the active device key partition to the boot up components of the data processing system. The method of FIG. 3C may end following operation 344 and the overall method may revert back to operation 324 of FIG. 3B.

In the event that the determination in operation 342 is "NO", as discussed above in reference to FIGS. 2B-2C, in operation 346, the management controller replaces the existing device key in the active device key storage with a new device key associated with a third device ID that matches the first device ID. In embodiments, the new device key may be obtained from a device key list of the device key repository.

In embodiments, the existing device key is associated with a first hardware component of the data processing system that is no longer installed within a body of the data processing system (e.g., a broken, out dated, or the like component that needs replacing), and the new device key is associated with a second hardware component (e.g., a new version of the broken, out dated, or the like component that is obtained to be a replacement for the broken, out dated, or the like component) that is installed into the body of the data processing system to replace the first hardware component.

In embodiments, as part of replacing the existing device key with the new device key, the management controller may parse the device key list to determine whether any device keys having the third device ID that matches the first device ID exists. If no device keys in the device key list includes the third device ID that matches the first device ID, the management controller may cause the boot up components to notify a user of the data processing system that the boot up process cannot be completed because no device keys exist for at least one component (software and/or hardware) installed in the data processing system that requires a device key to be accessible by the boot up components.

Alternatively, if a device key having the third device ID that matches the first device ID exists, the management controller will generate a copy of this device key and replace the existing device key in the active device key storage with this generated copy of the device key having the third device ID that matches the first device ID (as part of operation 346).

Upon being replaced, the existing device key is deleted from the active device key storage (as part of operation 346). In embodiments, deleting the existing device key from the active device key storage does not cause any existing copies of the existing device key in the device key list to also be deleted.

In operation 348, the management controller provides the new device key in the active device key storage to the boot up components of the data processing system. The method of FIG. 3C may end following operation 348 and the overall method may revert back to operation 324 of FIG. 3B.

In embodiments, the operations of FIG. 3C described above may be repeated for every device ID included in the data processing system component information of the device key request.

Returning back to operation 324 of FIG. 3B, the boot up components of the data processing system use the device key(s) provided by the management controller to complete a boot up of the data processing system. More specifically, the device key(s) are used by the boot up components to gain authorization to access (e.g., control, use, gain access to data stored in, etc.) one or more components (software and/or hardware) installed in the data processing system for the data processing system to complete booting of an operating system (OS) of the data processing system such that a user of the data processing system may use one or more computer implemented services and/or functions provided by the data processing system (e.g., place the data processing system in a desired operating state of the user).

In embodiments, upon completion of the data processing device's startup, none of the boot up components maintain a copy of the device key(s) received from the management controller in operation 324. Effectively, the only component within the data processing system that stores and has access to the device keys is the management controller. Thus, whenever a part (e.g., a device or component) within the data processing system is replaced, there is no longer a need to update the host's (e.g., the data processing system) build with new information (e.g., the new authentication key) associated with the newly replaced parts, which advantageously eliminates the need for a complete re-spin of the host's build.

Figure 4:
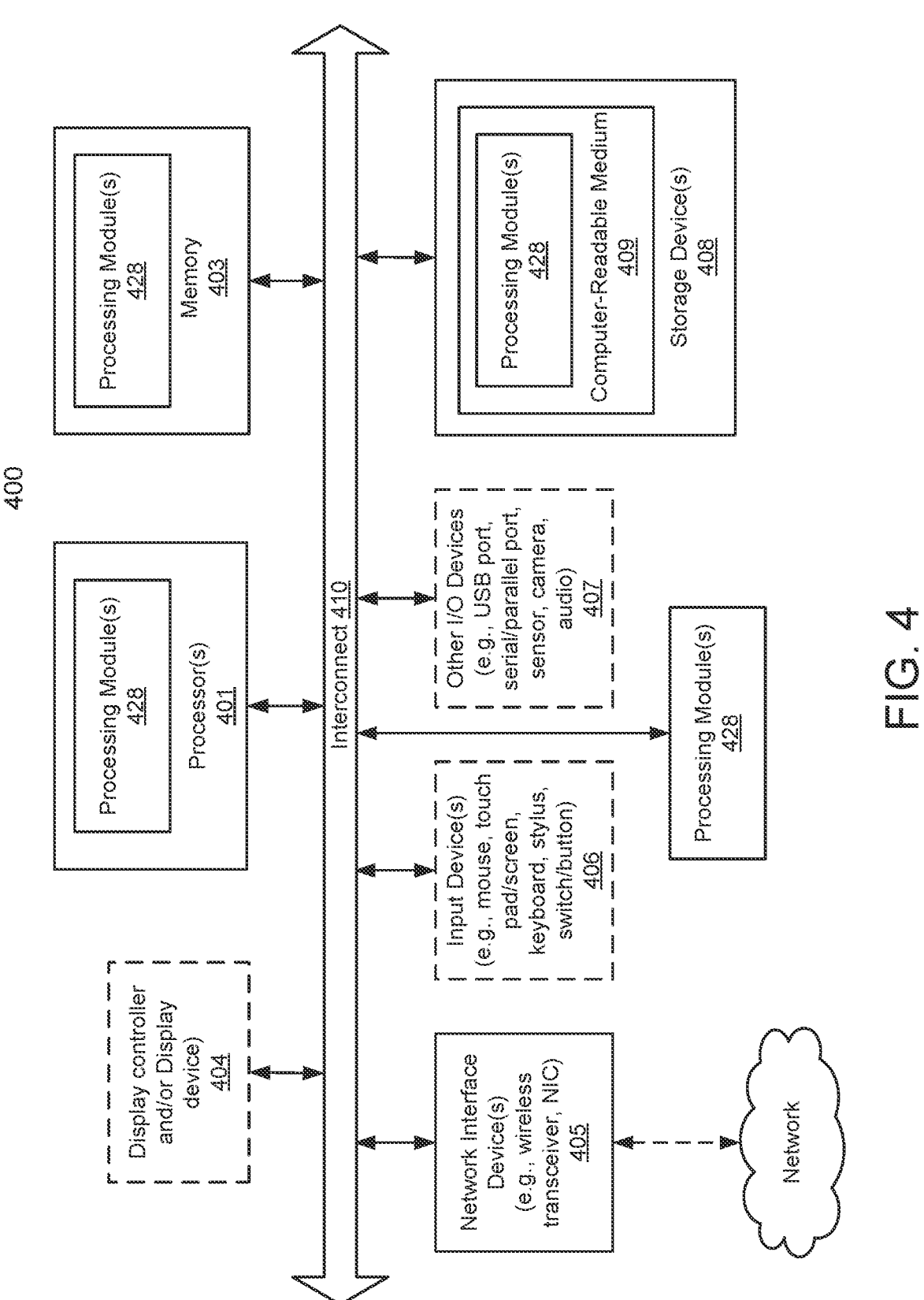
FIG. 4 shows a block diagram illustrating a computing device in accordance with one or more embodiments.

Any of the components illustrated in FIGS. 1A-3C may be implemented with one or more computing devices. Turning to FIG. 4, a block diagram illustrating an example of a computing device (also referred to herein as "system 400") in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of inter-connecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a boot up process of a data processing system, the method comprising:

obtaining, by a management controller the data processing system, a device key request from one or more boot up components of the data processing system, the device key request comprising data processing system component information;

parsing, by the management controller, the data processing system component information to obtain a first device identifier (ID);

determining, by the management controller, that the first device ID is different from a second device ID associated with an existing device key stored in an active device key storage of a device key repository;

replacing the existing device key in the active device key storage with a new device key stored in a device key repository of the management controller, the new device key having a third device ID that matches the first device ID;

providing, by the management controller, the new device key to the one or more boot up components as requested in the device key request; and using, by the one or more boot up components, the new device key to complete a boot up of the data processing system.

2. The method of claim 1, wherein the one or more boot up components are distinct and separate from the management controller, the one or more boot up components comprising a first processor, and the management controller comprising a second processor that is different and operates independently from the first processor.

3. The method of claim 2, the first processor being a main processor on which an operating system (OS) of the data processing system runs.

4. The method of claim 1, wherein an instance of the new device key and an instance of the existing device key separate from the existing device key stored in the active device key storage are stored in a device key list stored in the device key repository of the management controller, and replacing the existing device key in the active device key storage comprises:

deleting the existing device key from the active device key storage;

instantiating a copy of the new device key using the instance of the new device key stored in the device key list; and after deleting the existing device key from the active device key storage, storing the copy of the new device key into the active device key storage.

5. The method of claim 4, wherein the instance of the existing device key stored in the device key list is maintained even after the existing device key is deleted from the active device key storage.

6. The method of claim 5, wherein the existing device key is associated with a first hardware component of the data processing system that is no longer installed within a body of the data processing system, and the new device key is associated with a second hardware component that is installed into the body of the data processing system to replace the first hardware component.

7. The method of claim 6, the one or more boot up components do not maintain any copies of the device key provided by the management controller after completing the boot up of the data processing system.

8. The method of claim 2, wherein using the new device key to complete the boot up of the data processing system comprises:

unlocking, by the one or more boot up components, a secured portion of a memory device of the data processing system to access data processing system data stored in the memory device; and using, by the one or more boot up components, the data processing system data to boot up an operating system (OS) of the data processing system.

9. The method of claim 8, wherein the data processing system data comprises an image of the OS, the memory device is non-volatile memory, and the secured portion is a relay protected memory block (RPMB) of the non-volatile memory.

10. The method of claim 2, wherein before the device key request is obtained by the management controller, the method further comprises:

receiving, by the management controller, a replacement device key from a data processing system manager; and storing, by the management controller, the replacement device key in a device key list provisioned in the device key repository of the management controller, the device key list including the existing device key different from the replacement device key.

11. The method of claim 10, wherein the replacement device key is received by the management controller when the data processing system is in a powered off state.

12. A non-transitory machine-readable medium having instructions stored therein, which when executed by a processor, cause the processor to perform operations for managing a boot up process of a data processing system, the operations comprising:

obtaining, by a management controller the data processing system, a device key request from one or more boot up components of the data processing system, the device key request comprising data processing system component information;

parsing, by the management controller, the data processing system component information to obtain a first device identifier (ID);

determining, by the management controller, that the first device ID is different from a second device ID associated with an existing device key stored in an active device key storage of a device key repository;

replacing the existing device key in the active device key storage with a new device key stored in a device key repository of the management controller, the new device key having a third device ID that matches the first device ID;

providing, by the management controller, the new device key to the one or more boot up components as requested in the device key request; and using, by the one or more boot up components, the new device key to complete a boot up of the data processing system.

13. The non-transitory machine-readable medium of claim 12, wherein the one or more boot up components are distinct and separate from the management controller, the one or more boot up components comprising a first processor, and the management controller comprising a second processor that is different and operates independently from the first processor.

14. The non-transitory machine-readable medium of claim 13, the first processor being a main processor on which an operating system (OS) of the data processing system runs.

15. A data processing system comprising:

a management controller; and one or more boot up components, wherein data processing system stores instructions that causes the data processing system to perform operations for managing a boot up process of a data processing system, the operations comprising:

obtaining, by the management controller the data processing system, a device key request from the one or more boot up components of the data processing system, the device key request comprising data processing system component information;

parsing, by the management controller, the data processing system component information to obtain a first device identifier (ID);

determining, by the management controller, that the first device ID is different from a second device ID associated with an existing device key stored in an active device key storage of a device key repository;

replacing the existing device key in the active device key storage with a new device key stored in a device key repository of the management controller, the new device key having a third device ID that matches the first device ID;

providing, by the management controller, the new device key to the one or more boot up components as requested in the device key request; and using, by the one or more boot up components, the new device key to complete a boot up of the data processing system.

16. The data processing system of claim 15, wherein the one or more boot up components are distinct and separate from the management controller, the one or more boot up components comprising a first processor, and the management controller comprising a second processor that is different and operates independently from the first processor.

17. The data processing system of claim 16, the first processor being a main processor on which an operating system (OS) of the data processing system runs.

* * * * *